United States Patent [19]

Magnin

[11] Patent Number: 5,690,887
[45] Date of Patent: Nov. 25, 1997

[54] METHOD FOR OBTAINING A ZIRCONIA BASED ITEM

[75] Inventor: Pierre Magnin, Mont-sur-Lausanne, Switzerland

[73] Assignee: Asulab S.A., Bienne, Switzerland

[21] Appl. No.: 565,248

[22] Filed: Nov. 30, 1995

[30] Foreign Application Priority Data

Dec. 7, 1994 [CH] Switzerland ............ 03706/94

[51] Int. Cl.$^6$ ............................................. C04B 35/48
[52] U.S. Cl. ...................... 264/430; 264/345; 264/432
[58] Field of Search .............................. 264/430, 345, 264/432

[56] References Cited

U.S. PATENT DOCUMENTS

| | | | |
|---|---|---|---|
| 3,432,296 | 3/1969 | McKinnon et al. | 75/214 |
| 3,935,371 | 1/1976 | Camacho et al. | 219/121 |
| 4,119,469 | 10/1978 | Carbonnel et al. | 106/40 R |
| 4,501,717 | 2/1985 | Tsukamoto et al. | 418/58 |
| 5,171,491 | 12/1992 | Kim | 264/430 |

FOREIGN PATENT DOCUMENTS 2 132 600   7/1984   United Kingdom .

OTHER PUBLICATIONS

Database WPI Section Ch, Week 8721 Derwent Publications Ltd., London, GB; Class L02, AN 87–146562 & JP-A-62 083 366 (Kyocera Corp), 16 Apr.1987.

Patent Abstracts of Japan vol. 015, No. 373 (C–0869), 19 Sep. 1991 & JP-A-03 150263 (JGC Corp) 26 Jun. 1991.

*Primary Examiner*—James Derrington
*Attorney, Agent, or Firm*—Griffin, Butler, Whisenhunt & Kurtossy

[57] ABSTRACT

A method for obtaining a finished or semi-finished item in sintered zirconia having a metallic appearance comprises the steps of providing at least one previously shaped and sintered zirconia item in its finished or semi-finished shape, placing the item in an oven in which there is a plasma containing hydrogen, bringing the item to a temperature of around 800° C. or more, and maintaining the item at this temperature for a period of time from around a quarter of an hour to three hours, preferably two hours.

2 Claims, No Drawings

METHOD FOR OBTAINING A ZIRCONIA BASED ITEM

FIELD OF THE INVENTION

The present invention concerns a method for obtaining a zirconia based item and, in particular, an item of this type having a metallic appearance intended notably to be used in decorative applications.

BACKGROUND OF THE INVENTION

Among all known materials, metals are very widely used because of their very advantageous properties: high levels of mechanical resistance and toughness, electrical conductivity, etc. Furthermore, their characteristic lustre is very much sought after for decorative applications. Their hardness is however inferior to that of ceramic materials, which may lead to significant wear in numerous common conditions of use, for example when these materials are used to make exterior parts used in watchmaking such as watch cases.

For this reason, one has for a long time sought to increase the hardness of metals. Conventional metallurgic methods (quenching, structural hardening) do not enable the high levels of hardness, greater than 1000 HV (Vickers hardness) required for certain applications, such as those for cutting tools or scratchproof decorative items, to be obtained.

For these applications, one has attempted further to increase the hardness of metals by the addition of very hard particles, by making two-phase composites formed of a metallic phase coating the hard particles, which frequently take up most of the volume of the material. A certain number of materials of this type have been developed and are today commonly used in the industry. They are generally called "hard metal" when the hard particles used are formed of tungsten carbide, and "cermet" when they are titanium carbonitride.

However, all these materials have in common the fact that they comprise a distinct metallic phase, which may limit their resistance to corrosion and their mechanical properties at high temperatures.

Further, this metallic phase always contains nickel or cobalt, all attempts to substitute other metals for these materials having failed until now. However, the use of this metallic phase with nickel and cobalt, in applications which lead to prolonged contact with the skin, such as for example watchmaking or jewellery applications, must be avoided for these elements are known to frequently cause allergies.

Finally, these materials are generally difficult to shape, which constitutes a significant limitation during manufacturing of exterior parts for watchmaking or parts for jewellery—which are often complex shapes—and makes their cost very high.

SUMMARY OF THE INVENTION

An object of the invention is thus to overcome all these disadvantages by providing a method for obtaining a zirconia based item having all the conventional properties of ceramic parts (hardness, ability to be shaped easily, lack of allergenic reaction etc.) while having the lustre of metallic parts.

The invention concerns a method for obtaining a finished or semi-finished item in sintered zirconia having a metallic appearance, characterised in that it comprises steps consisting of:

providing at least one previously shaped zirconia item in its finished or semi-finished shape;

placing said item in an oven in which there is a plasma containing hydrogen;

bringing said item to a temperature of around 800° C. or more;

maintaining said item at this temperature for a period of time from around a quarter of an hour to three hours and preferably two hours.

The approach for making items of this type is fundamentally new. The starting point was to make, in accordance with conventional techniques, a conventional ceramic part having all the required properties, but with no metallic features, this part was then subjected to the method according to the invention in order to give it a metallic appearance.

The items obtained by this method acquire certain properties of metals, notably their electrical conductivity and their metallic lustre while keeping their ceramic properties, in particular their hardness.

In complete contrast to existing "hard metals" and "cermet", the zirconia items according to the invention have only certain characteristics of metals, but they do not contain any metallic phases.

DESCRIPTION OF PREFERRED EMBODIMENT

An embodiment example of a sintered zirconia item having a metallic appearance with the method for obtaining it according to the invention will now be described below.

By way of example, one provides a white zirconia item having a tetragonal crystallographic structure (zirconium oxide, $ZrO_2$) which is made in accordance with conventional manufacturing techniques for ceramic items, for example by sintering.

This item may be a finished product exhibiting the final shape in which it will be used, for example a part of generally parallelepiped shape intended to form a watch bracelet element.

Of course, if necessary the item may be a semi-finished product which may subsequently undergo machining operations in order to adapt it to its final use.

This item is then heated to 800° C. or more and placed, for a period of time from a quarter of an hour to three hours, and preferably for two hours, in a hydrogen plasma, obtained for example with the aid of an electric discharge or a microwave generator.

After the latter operation, the item exhibits an attractive appearance and a metallic lustre.

The method according to the invention enables an item combining certain of the characteristics of ceramics and metals, without the presence of any metallic phase.

It is thus possible to obtain items of great hardness having a particularly aesthetic metallic appearance and lustre, easy to shape and not liable to cause allergic reactions. Consequently, these items are perfectly suited to use as decorative items and in particular as construction element of bracelets or cases for watchmaking.

What is claimed is:

1. A method for obtaining a finished or semi-finished item in sintered zirconia having a metallic appearance, said method comprising the steps of:

providing a previously shaped and sintered zirconia item;

placing said shaped and sintered zirconia item in an oven in which there is a plasma containing hydrogen;

bringing said item to a temperature of around 800° C. or more; and, maintaining said item at said temperature for a period of time from around a quarter of an hour to three hours.

2. A method as claimed in claim 1 wherein said item is maintained at said temperature for about two hours.

* * * * *